United States Patent

Oh

(10) Patent No.: US 8,972,115 B1
(45) Date of Patent: Mar. 3, 2015

(54) MOTOR DRIVEN POWER STEERING AND METHOD FOR DRIVING THE SAME

(71) Applicant: Hyundai Mobis Co., Ltd., Seoul (KR)

(72) Inventor: Se Wook Oh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/179,184

(22) Filed: Feb. 12, 2014

(30) Foreign Application Priority Data

Dec. 3, 2013 (KR) .......................... 10-2013-0149434

(51) Int. Cl.
*B62D 5/04* (2006.01)
*H02P 29/02* (2006.01)

(52) U.S. Cl.
CPC ............ *H02P 29/028* (2013.01); *B62D 5/0496* (2013.01); *B62D 5/0463* (2013.01); *B62D 5/0481* (2013.01); *B62D 5/046* (2013.01); *Y10S 388/934* (2013.01); *Y10S 388/93* (2013.01)
USPC ............... 701/43; 701/42; 180/446; 388/930; 388/934; 318/433; 318/434; 318/472; 318/473; 361/24; 388/930

(58) Field of Classification Search
CPC .. B62D 5/0496; B62D 5/0481; B62D 5/0463; B62D 5/046; Y10S 388/93; Y10S 388/934
USPC ............................. 701/41–43; 180/443, 446; 318/471–473, 432–434; 361/23, 24; 388/930, 934
See application file for complete search history.

(56) References Cited

U.S. PATENT DOCUMENTS

| | | | | | |
|---|---|---|---|---|---|
| 4,789,040 | A | * | 12/1988 | Morishita et al. .............. | 180/446 |
| 8,019,508 | B2 | * | 9/2011 | Takeuchi et al. ................ | 701/42 |
| 8,196,698 | B2 | * | 6/2012 | Tamaki ........................... | 180/444 |
| 8,251,172 | B2 | * | 8/2012 | Inoue et al. .................... | 180/446 |
| 2008/0217098 | A1 | * | 9/2008 | Takeuchi et al. .............. | 180/446 |
| 2011/0160965 | A1 | * | 6/2011 | Oh .................................. | 701/42 |

FOREIGN PATENT DOCUMENTS

KR   10-2012-0019889 A   3/2012

* cited by examiner

*Primary Examiner* — Russell Frejd
(74) *Attorney, Agent, or Firm* — Knobbe Martens Olson & Bear LLP

(57) ABSTRACT

A motor driven power steering (MDPS) may include: a vehicle speed sensor configured to sense vehicle speed; a temperature sensor configured to sense a temperature of a power pack; a current sensor configured to sense an amount of current applied to the MDPS; a storage unit configured to store a thermal resistance value based on the vehicle speed with respect to the temperature of the power pack; and a control unit configured to calculate an estimated temperature by reflecting the thermal resistance value based on the vehicle speed with respect to the temperature of the power pack and the current amount applied to the MDPS into a temperature estimation function, and drive a motor according to the calculated estimated temperature.

15 Claims, 6 Drawing Sheets

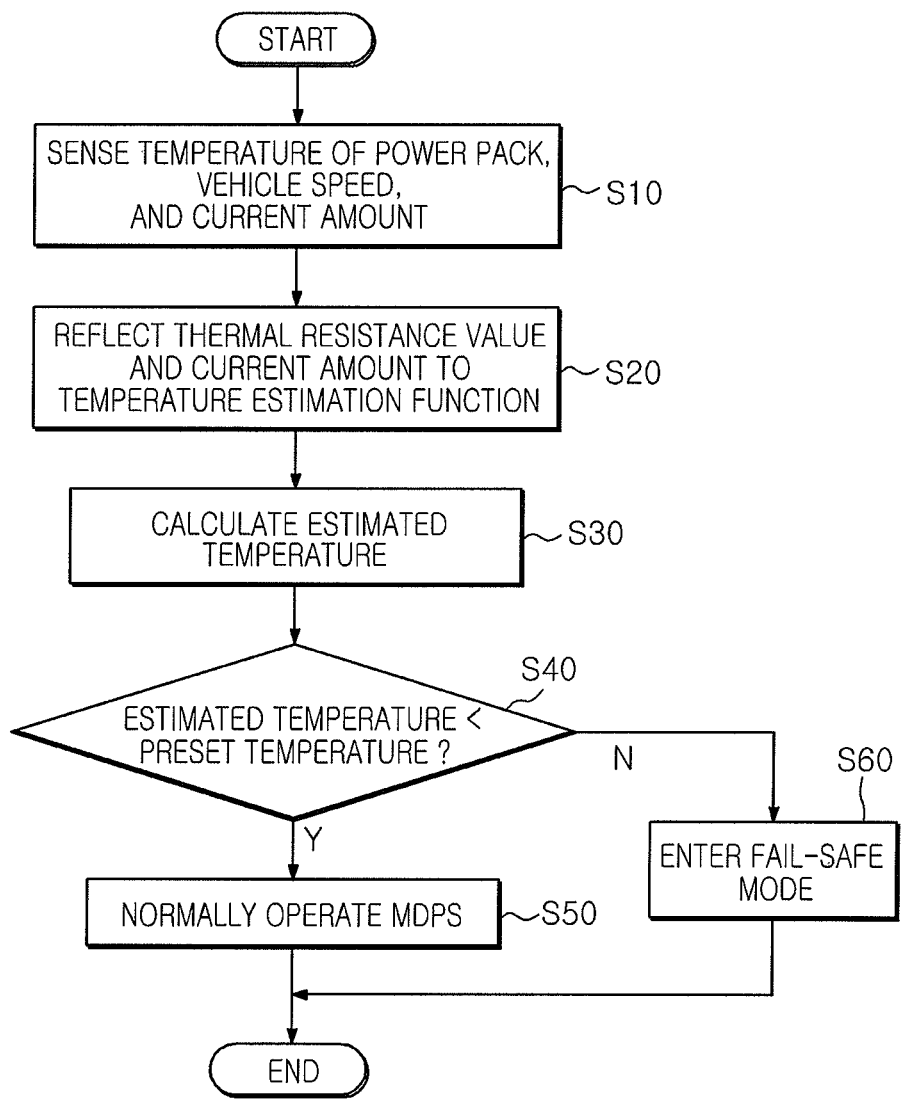

MOTOR DRIVEN POWER STEERING AND METHOD FOR DRIVING THE SAME

CROSS-REFERENCES TO RELATED APPLICATIONS

The present application claims priority to Korean application number 10-2013-0149434, filed on Dec. 3, 2013, which is incorporated by reference in its entirety.

BACKGROUND OF THE INVENTION

The present invention relates to a motor driven power steering (MDPS) and a method for driving the same, and more particularly, to an MDPS and a method for driving the same, which estimates the temperature of a motor by reflecting the thermal characteristic (heat radiation performance) of the MDPS depending on a traveling state of a vehicle, and controls an amount of current applied to the motor.

Since MDPS generates an assist thrust through a motor, each upper logic calculates a proper command. The command is closely related to column torque measured by MDPS in terms of performance, but closely related to protection logic such as over heating protection (OHP) logic in terms of fail-safe logic.

That is, when MDPS operating logic illustrated in FIG. 1 senses a motion of a steering wheel by a driver, a command calculated through steering performance logic is passed through torque limit logic to limit excessive torque, and steering torque is generated by a command calculated through motor control logic.

The torque limit logic is protection logic which limits a motor output to safely operate MDPS, when MDPS is not in a normal state.

Representative examples of the torque limit logic may include OHP logic. When a power pack (ECU+motor of MDPS) is overheated, the OHP logic reduces torque commands and uses a minimum amount of current to prevent the power pack hardware from being overheated and burned out.

In many cases, the OHP logic is operated through only one temperature sensor, in order to reduce cost. Using a value calculated from a temperature estimation function for the position of each part (motor, ECU, or temperature sensor) based on a temperature sensor mounted in the ECU, the OHP logic of the fail-safe logic may limit the maximum current when an estimated temperature for each part reaches a critical temperature, or may reduce the magnitude of the maximum current according to the estimated temperature.

However, since such a method estimates the temperature using one temperature sensor, the temperature for each part cannot be precisely estimated. In particular, each part within the power pack, such as FET, motor, or power module, has a different temperature increase characteristic. Thus, the performance of the part may be degraded by overheat due to a difference between the estimated temperature and the measured temperature, or the performance of the system may be degraded by excessive application of the fail-safe logic.

The related art of the present invention is disclosed in Korean Patent Laid-open Publication No. 10-2012-0019889 published on Mar. 7, 2012 and entitled "System and method for over heat protection of motor for motor driven power steering".

SUMMARY OF THE INVENTION

An embodiment of the present invention is directed to a motor driven power steering (MDPS) and a method for driving the same, which estimates the temperature of a motor by reflecting the thermal characteristic (heat radiation performance) of the MDPS depending on the traveling state of a vehicle when the motor of the MDPS is driven, thereby controlling the amount of current applied to the motor.

Another embodiment of the present invention is directed to an MDPS and a method for driving the same, which applies a variable thermal coefficient of resistance based on vehicle speed to a temperature estimation function included in over heating protection (OHP) logic serving as protection logic of the MDPS, thereby more precisely estimating the temperature of a motor.

In one embodiment, a motor driven power steering (MDPS) may include: a vehicle speed sensor configured to sense vehicle speed; a temperature sensor configured to sense a temperature of a power pack; a current sensor configured to sense an amount of current applied to the MDPS; a storage unit configured to store a thermal resistance value based on the vehicle speed with respect to the temperature of the power pack; and a control unit configured to calculate an estimated temperature by reflecting the thermal resistance value based on the vehicle speed with respect to the temperature of the power pack and the current amount applied to the MDPS into a temperature estimation function, and drive a motor according to the calculated estimated temperature.

The control unit may control the MDPS to enter a fail-safe mode, when the calculated estimated temperature is equal to or more than a preset temperature.

The fail-safe mode may include a mode in which the control unit adjusts a torque gain according to the estimated temperature, and limits a current value of the motor when driving the motor.

When the estimated temperature increases to a critical temperature or more, the control unit may not adjust the torque gain.

The temperature estimation function may be expressed as the following equation: $T = T_i + \Delta T = T_i + \int [(\text{current})^2 \times \text{thermal resistance}] \times \text{time}$.

In another embodiment, a method for driving MDPS, may include: receiving, by a control unit, a temperature of a power pack, sensed through a temperature sensor, vehicle speed sensed through a vehicle sensor, and an amount of current applied to the MDPS, sensed through a current sensor; applying a thermal resistance value based on the vehicle speed with respect to a temperature of the power pack and the current amount sensed through the current sensor into a temperature estimation function to calculate an estimated temperature, wherein the thermal resistance value is obtained by referring to a thermal resistance value stored in a storage unit; and driving a motor according to the calculated estimated temperature.

The thermal resistance value stored in the storage unit may increase with the increase of vehicle speed and the decrease of temperature.

The driving of the motor according to the calculated estimated temperature may include controlling the MDPS to enter a fail-safe mode, when the calculated estimated temperature is equal to or more than a preset temperature.

The fail-safe mode may include a mode in which the control unit adjusts a torque gain according to the estimated temperature and limits a current value of the motor when driving the motor.

When the estimated temperature increases to a critical temperature or more, the control unit may not adjust the torque gain.

The power pack may include an electronic control unit and a motor of the MDPS.

The temperature estimation function may be expressed as the following equation: $T=T_i+\Delta T=T_i+\int[(current)^2 \times thermal\ resistance] \times time$.

In accordance with the embodiments of the present invention, the MDPS and the method for driving the same may reflect the thermal characteristic (heat radiation performance) of the MDPS depending on the traveling state of the vehicle and estimate the temperature of the motor, when the motor of the MDPS is driven. Thus, the amount of current applied to the motor may be controlled to prevent the motor from being overloaded, and the steering performance may be enhanced to thereby improve the system performance.

Furthermore, in the temperature estimation function included in the OHP logic serving as protection logic of the MDPS, a variable temperature coefficient of resistance based on vehicle speed may be applied to more precisely estimate the temperature of the motor. Thus, the performance of the OHP logic may be improved. Furthermore, with the increase of the maximum current, a small motor may be applied to thereby reduce the production cost.

Furthermore, when the vehicle is operated at high speed, the assist of the power pack (ECU+motor of MDPS) may be secured as much as possible. The steering performance may be improved with stability and reliability. Furthermore, since cooling information of the traveling vehicle can be secured, the assist may be maintained for a long time, which makes it easy for a driver to operate a steering wheel.

BRIEF DESCRIPTION OF THE DRAWINGS

FIG. 6 is a flowchart illustrating a method for driving MDPS in accordance with an embodiment of the present invention.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
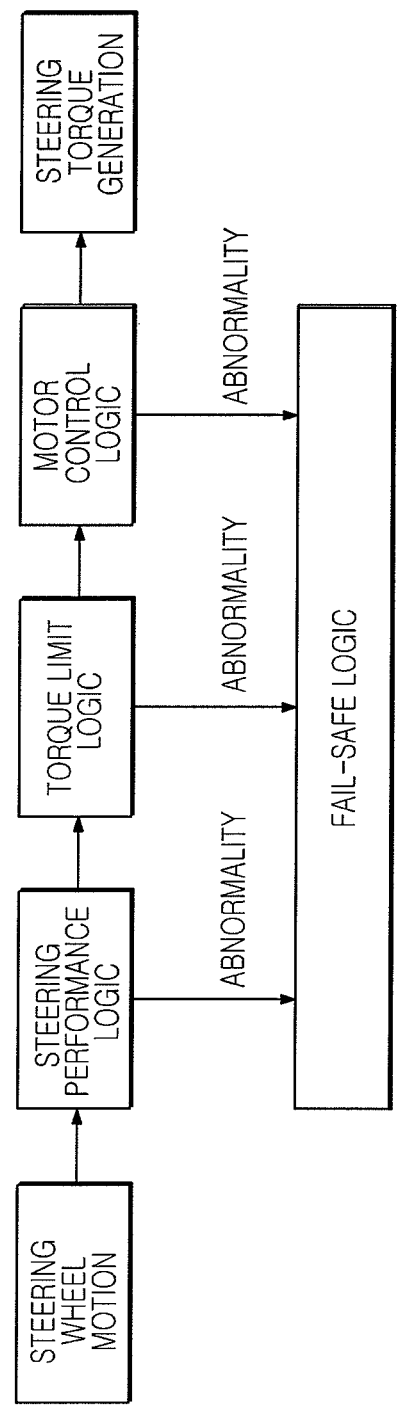
FIG. 1 briefly illustrates MDPS operating logic.
Figure 2:
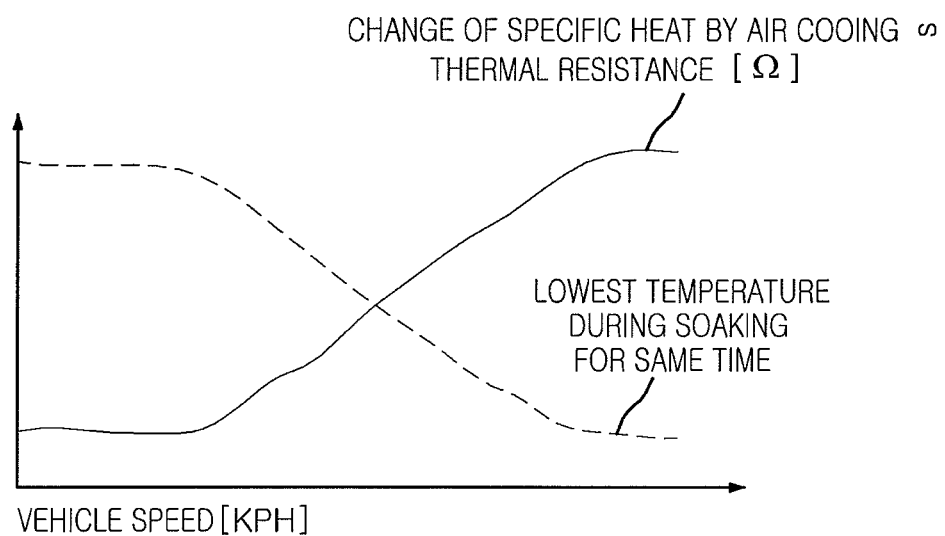
FIG. 2 is a graph illustrating the thermal characteristics of a power pack.

FIG. 2 is a graph illustrating the thermal characteristics of a power pack.

As illustrated in FIG. 2, when vehicle speed is increased, air velocity increases in the environment of an actual vehicle. In this case, a cooling effect may be improved, and friction with the ground may be reduced. Therefore, transmission of frictional force may be reduced.

Thus, with the increase of vehicle speed, the change of specific heat may be gradually increased by air cooling. Finally, thermal resistance may increase.

On the other hand, with the increase of vehicle speed, the lowest temperature may gradually decrease during no steering operation.

The above-described results may indicate that the characteristic of an over-heating protection (OHP) function differs depending on the vehicle speed. Such a difference in characteristic may be most representatively expressed by thermal resistance.

Thus, the present invention provides a motor driven power steering (MDPS) for varying thermal resistance according to vehicle speed and surrounding temperature.

The surrounding temperature may indicate the temperature of an environment in which a power pack (ECU and motor of MDPS) is mounted. For example, since there exists a significant difference in temperature between desert and polar region, a basic temperature difference may exist. Furthermore, even during operation, there may exist a significant difference in cooling characteristic depending on a flow of surrounding air.

Furthermore, the temperature characteristic of the power pack may differ depending on the position at which MDPS is mounted. In the case of R-MDPS mounted around a rack-pinion of MDPS, the temperature characteristic of the power pack may differ depending on an overheat condition of an engine, due to heat convection.

Figure 3:
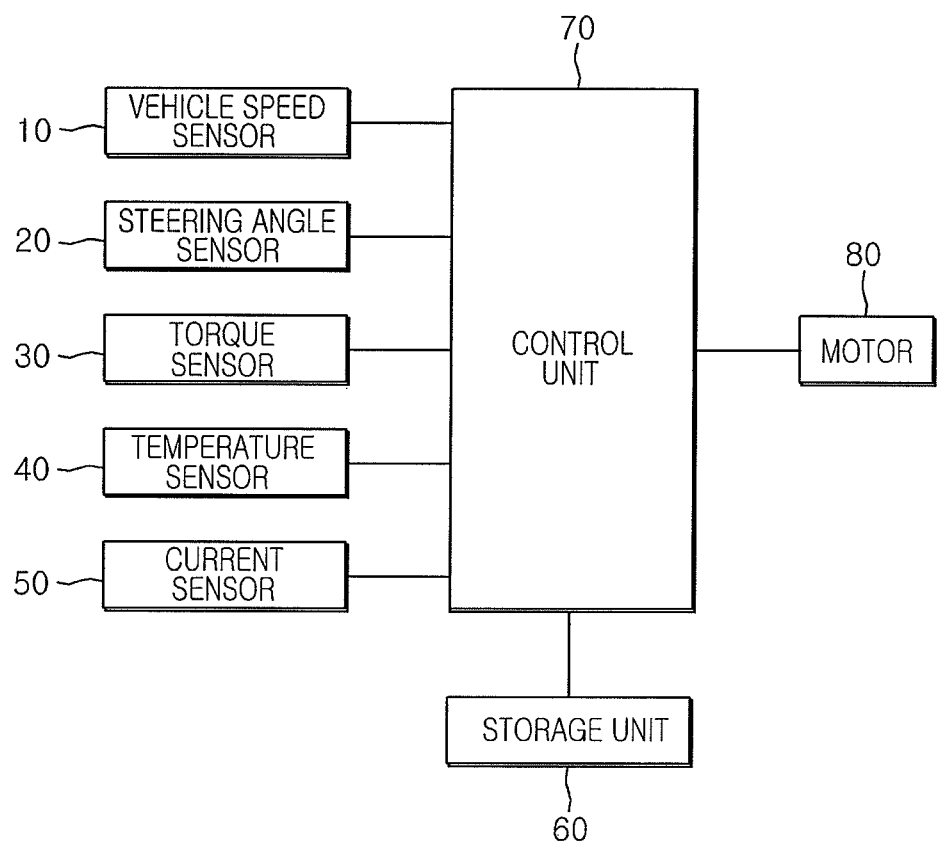
FIG. 3 is a block configuration diagram of MDPS in accordance with an embodiment of the present invention.

FIG. 3 is a block configuration diagram of MDPS in accordance with an embodiment of the present invention.

As illustrated in FIG. 3, the MDPS in accordance with the embodiment of the present invention may include a vehicle sensor 10, a steering angle sensor 20, a torque sensor 30, a temperature sensor 40, a current sensor 50, a storage unit 60, a control unit 70, and a motor 80.

The vehicle sensor 10 may detect vehicle speed when a vehicle is operated, and provide the detected vehicle speed.

The steering angle sensor 20 may detect a steering angle based on a steering operation for a steering wheel (not illustrated) by a driver, and provide the detected steering angle.

The torque sensor 30 may detect column torque of the steering wheel, and provide the detected column torque.

The temperature sensor 40 may detect the temperature of a power pack (ECU+motor of MDPS) and provide the detected temperature.

The current sensor 50 may detect an amount of current applied to the MDPS and provide the detected current amount.

The storage unit 60 may store a thermal resistance value based on the vehicle speed with respect to the temperature of the power pack.

At this time, the thermal resistance value stored in the storage unit 60 may be stored as a value which increases with the increase of vehicle speed and the decrease of temperature.

The reason is as follows. As described above, with the increase of vehicle speed in the environment of an actual vehicle, the change of specific heat may be gradually increased by air cooling. Thus, thermal resistance may increase. Furthermore, with the increase of vehicle speed, the lowest temperature may gradually decrease during cooling operation for the same time. Thus, the thermal resistance may increase with the increase of vehicle speed and the decrease of temperature.

The control unit 70 may receive the vehicle speed, the steering angle, and the column torque from the vehicle sensor 10, the steering angle sensor 20, and the torque sensor 30, respectively, adjust the drivability of the motor 80 according to the traveling speed of the vehicle, and provide assist torque to a steering wheel operated by a driver such that the steering wheel is lightly operated at low speed and heavily operated at high speed, thereby securing driving stability.

Furthermore, when the control unit 70 receives a sensor value from the steering angle sensor 20 and calculates a steering angle, the control unit 70 may calculate the steering angle based on an initial steering angle which is set immediately after the vehicle is started, and generate assist torque.

Furthermore, when the OHP logic of the MDPS estimates the temperature of the power pack, the control unit 70 may reflect the thermal resistance value based on the vehicle speed with respect to the temperature of the power pack, stored in the storage unit 60, and the amount of current applied to the MDPS, detected through the current sensor 50, into a temperature estimation function to calculate an estimated temperature. According to the calculated estimated temperature, the control unit 70 may drive the motor 80.

The temperature estimation function may be included in the OHP logic. In order to implement the temperature estimation function, a simulation model may be constructed, and tested temperature data may be inputted to calculate parameters of a temperature transmission function. The parameters of the temperature transmission function may include thermal resistance, a temperature capacitor and the like.

The temperature estimation function may be expressed as follows:

$$T = T_i + \Delta T = T_i + \int [(\text{current})^2 \times \text{thermal resistance}] \times \text{time}$$

Here, T represents the estimated temperature, $T_i$ represents an initial temperature (or stored temperature of power pack), and $\Delta T$ represents a temperature change.

The control unit 70 may normally drive the MDPS when the calculated estimated temperature is less than a preset temperature, and control the MDPS to enter a fail-safe mode when the calculated estimated temperature is equal to or more than the preset temperature.

The fail-safe mode is where the control unit 70 adjusts a torque gain according to the estimated temperature, and limits a current value of the motor 80 when driving the motor 80. More specifically, when the estimated temperature increases to a critical temperature or more, the control unit 70 does not reflect the torque gain.

Figure 4:
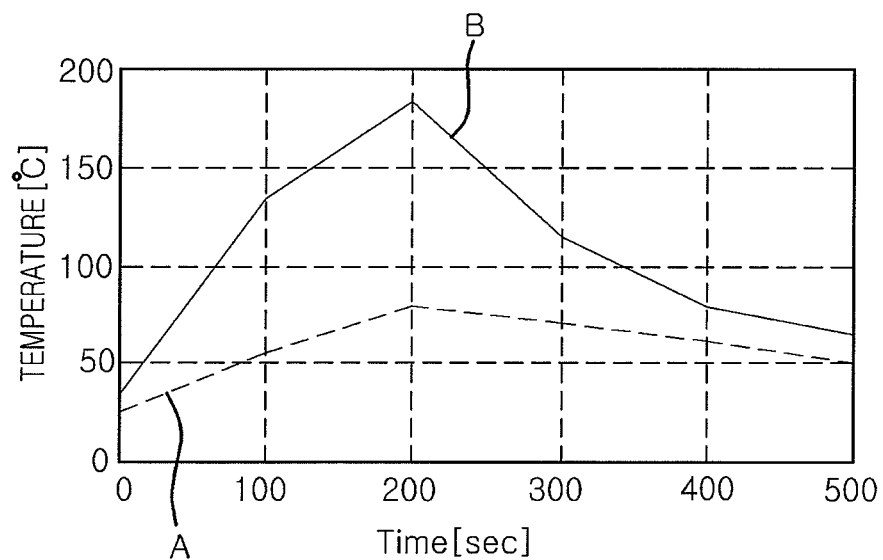
FIG. 4 illustrates estimated temperature and measured temperature before the MDPS in accordance with the embodiment of the present invention is applied.
Figure 5:
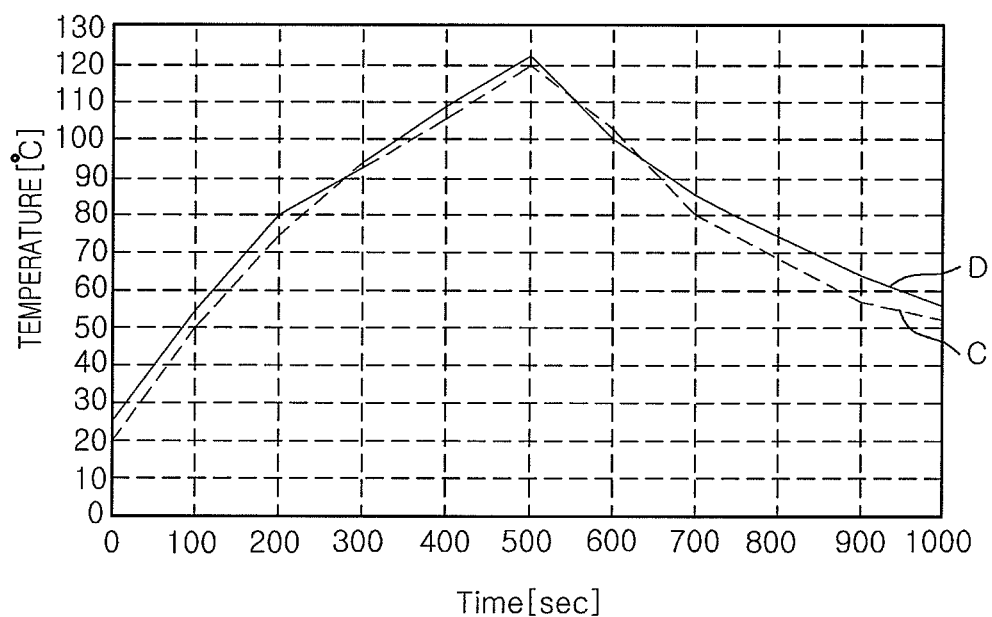
FIG. 5 illustrates estimated temperature and measured temperature after the MDPS in accordance with the embodiment of the present invention is applied.

FIG. 4 illustrates estimated temperature and measured temperature before the MDPS in accordance with the embodiment of the present invention is applied. FIG. 5 illustrates estimated temperature and measured temperature after the MDPS in accordance with the embodiment of the present invention is applied.

In FIG. 4, a graph A illustrates the measured temperature, and a graph B illustrates the estimated temperature. In FIG. 5, a graph C illustrates the measured temperature, and a graph D illustrates the estimated temperature.

In order to compare how similar the temperature characteristics before and after the application of the MDPS are to actual characteristics, a vehicle test was performed as follows.

First, a high-temperature chamber is used to heat the power pack at an atmosphere temperature of 100° C. for 10 minutes, and the power pack is mounted on a dynamo. Under such a condition, a fan is used to cool down the power pack.

At this time, the power pack is operated at a peak load and then stopped to compare the heat radiation temperature characteristics of the power pack in FIGS. 4 and 5, using the result values of a thermocouple attached at an estimation position and the temperature estimation function.

As known from the comparison results, a temperature difference exists between graphs A and B of FIG. 4, which indicates that precision decreases. On the other hand, a slight temperature difference exists between graphs C and D of FIG. 5. That is, when the MDPS in accordance with the embodiment of the present invention is applied to use the thermal resistance value based on vehicle speed with respect to temperature, the precision may be increased.

As described above, the MDPS in accordance with the embodiment of the present invention may reflect the thermal characteristic (heat radiation performance) of the MDPS depending on the traveling state of the vehicle and estimate the temperature of the motor, when the motor of the MDPS is driven. Thus, the amount of current applied to the motor may be controlled to prevent the motor from being overloaded, and the steering performance may be enhanced to thereby improve the system performance.

Furthermore, in the temperature estimation function included in the OHP logic serving as protection logic of the MDPS, a variable temperature coefficient of resistance based on vehicle speed may be applied to more precisely estimate the temperature of the motor. Thus, the performance of the OHP logic may be improved. Furthermore, with the increase of the maximum current, a small motor may be applied to thereby reduce the production cost.

Furthermore, when the vehicle is operated at high speed, the assist of the power pack (ECU+motor of MDPS) may be secured as much as possible. The steering performance may be improved with stability and reliability. Furthermore, since cooling information of the traveling vehicle can be secured, the assist may be maintained for a long time, which makes it easy for a driver to operate a steering wheel.

FIG. 6 is a flowchart illustrating a method for driving MDPS in accordance with an embodiment of the present invention. Referring to FIG. 6, the method for driving MDPS in accordance with the embodiment of the present will be described in detail.

The control unit 70 may receive a temperature of the power pack, detected through the temperature sensor 40, and an amount of current applied to the MDPS, sensed through the current sensor 50, at step S10.

Then, the control unit 70 may reflect a thermal resistance value based on vehicle speed with respect to the detected temperature of the power pack and the current amount sensed through the current sensor 50 into the temperature estimation function by referring to a thermal resistance value stored in the storage unit 60, and calculate an estimated temperature at steps S20 and S30.

At this time, the thermal resistance value stored in the storage unit 60 is stored as a value which increases with the increase of vehicle speed and the decrease of temperature.

The reason is as follows. As described above, with the increase of vehicle speed in the environment of an actual vehicle, the change of specific heat may be gradually increased by air cooling. Thus, thermal resistance may increase. Furthermore, with the increase of vehicle speed, the lowest temperature may gradually decrease during cooling operation for the same time. Thus, the thermal resistance may increase with the increase of vehicle speed and the decrease of temperature.

The control unit 70 may compare the estimated temperature calculated at step S30 to a preset temperature at step S40. When the estimated temperature is less than the preset temperature, the control unit 70 may normally drive the MDPS at step S50, and when the estimated temperature is equal to or more than the preset temperature, the control unit 70 may control the MDPS to enter the fail-safe mode at step S60.

The fail-safe mode is where the control unit 70 adjusts a torque gain according to the estimated temperature, and limits a current value of the motor 80 when driving the motor 80.

More specifically, when the estimated temperature increases to a critical temperature or more, the control unit 70 may not reflect the torque gain.

As described above, the method for driving MDPS in accordance with the embodiment of the present invention may reflect the thermal characteristic (heat radiation performance) of the MDPS depending on the traveling state of the vehicle and estimate the temperature of the motor, when the motor of the MDPS is driven. Thus, the amount of current applied to the motor may be controlled to prevent the motor from being overloaded, and the steering performance may be enhanced to thereby improve the system performance.

Furthermore, in the temperature estimation function included in the OHP logic serving as protection logic of the MDPS, a variable temperature coefficient of resistance based on vehicle speed may be applied to more precisely estimate the temperature of the motor. Thus, the performance of the OHP logic may be improved. Furthermore, with the increase of the maximum current, a small motor may be applied to thereby reduce the production cost.

Furthermore, when the vehicle is operated at high speed, the assist of the power pack (ECU+motor of MDPS) may be secured as much as possible. The steering performance may be improved with stability and reliability. Furthermore, since cooling information of the traveling vehicle can be secured, the assist may be maintained for a long time, which makes it easy for a driver to operate a steering wheel.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A motor driven power steering (MDPS) comprising:
   a power pack comprising a motor and a control unit;
   a vehicle speed sensor configured to sense a vehicle speed;
   a temperature sensor configured to sense a temperature at the power pack;
   a current sensor configured to sense a current applied to the motor;
   and
   the control unit configured to calculate an estimated temperature using the current from the current sensor and a thermal resistance value that is obtained using the vehicle speed and the temperature at the power pack, the control unit further configured to control driving of the motor using the estimated temperature.

2. The MDPS of claim 1, wherein the control unit is configured to control the MDPS to enter a fail-safe mode when the estimated temperature is equal to or higher than a pre set temperature.

3. The MDPS of claim 2, wherein in the fail-safe mode, the control unit is configured to adjust a torque gain based on the estimated temperature.

4. The MDPS of claim 3, wherein when the estimated temperature reaches or exceeds a critical temperature, the control unit is configured to not adjust the torque gain.

5. The MDPS of claim 1, wherein the estimated temperature is calculated using the following equation:

$$T=T_i+\Delta T=T_i+\int[(\text{current})^2 \times \text{thermal resistance}]\times \text{time}$$

where T represents the estimated temperature, $T_i$ represents an initial temperature (or the temperature of the power pack), and $\Delta T$ represents a temperature change.

6. The MDPS of claim 1, further comprising a memory storing thermal resistance data, wherein the thermal resistance value is obtained with reference to the thermal resistance data stored in the memory using the vehicle speed and the temperature at the power pack.

7. The MDPS of claim 6, wherein the thermal resistance value has a correlation with the vehicle speed and the temperature such that the thermal resistance value increases as the vehicle speed increases and as the temperature decreases.

8. The MDPS of claim 3, wherein the control unit is configured to limit the current applied to the motor.

9. A method for operating an MDPS that comprises a power pack, the method comprising:
   sensing a temperature at the power pack;
   sensing a vehicle speed;
   sensing a current applied to a motor of the MDPS;
   obtaining a thermal resistance value based on the vehicle speed and the temperature;
   calculating an estimated temperature using the current and the thermal resistance value; and
   controlling driving of the mother using estimated temperature.

10. The method of claim 9, wherein obtaining the thermal resistance value uses thermal resistance data stored in a memory, wherein the thermal resistance value has a correlation with the vehicle speed and the temperature such that the thermal resist value increases as vehicle speed increases and as the temperature decreases.

11. The method of claim 9, wherein the driving of the motor comprising controlling the MDPS to enter a fail-safe mode, when the estimated temperature is equal to or higher than a preset temperature.

12. The method of claim 11, wherein the fail-safe mode, torque gain is adjusted based on the estimated temperature, and the current applied to the motor is limited when driving the motor.

13. The method of claim 12, wherein when the estimated temperature reaches or exceeds a critical temperature the torque gain is not adjusted.

14. The method of claim 9, wherein the power pack comprises an electronic control unit and the motor.

15. The method of claim 9, wherein the estimated temperature is calculated using the following equation:

$$T=T_i+\Delta T=T_i+\int[(\text{current})^2 \times \text{thermal resistance}]\times \text{time}$$

where T represents the estimated temperature, $T_i$ represents an initial temperature (or the temperature of the power pack), and $\Delta T$ represents a temperature change.

* * * * *